United States Patent
Chen et al.

(10) Patent No.: US 11,625,224 B2
(45) Date of Patent: Apr. 11, 2023

(54) APPARATUS AND METHOD USING NEURAL NETWORK

(71) Applicant: CANON KABUSHIKI KAISHA, Tokyo (JP)

(72) Inventors: Tsewei Chen, Tokyo (JP); Masami Kato, Sagamihara (JP); Masahiro Ariizumi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 16/387,262

(22) Filed: Apr. 17, 2019

(65) Prior Publication Data

US 2019/0332356 A1    Oct. 31, 2019

(30) Foreign Application Priority Data

Apr. 26, 2018 (JP) .............................. JP2018-085519

(51) Int. Cl.
 *G06F 7/533* (2006.01)
 *G06F 7/544* (2006.01)
 *G06N 3/08* (2023.01)

(52) U.S. Cl.
 CPC ............ *G06F 7/533* (2013.01); *G06F 7/5443* (2013.01); *G06N 3/08* (2013.01)

(58) Field of Classification Search
 CPC ................... G06F 7/533; G06F 7/5443; G06F 2207/4824; G06N 3/08; G06N 3/0481; G06N 3/0454
 USPC ........................................................ 708/627
 See application file for complete search history.

(56) References Cited

U.S. PATENT DOCUMENTS

| | | | |
|---|---|---|---|
| 6,438,569 B1* | 8/2002 | Abbott ................. | G06F 7/5443 708/603 |
| 8,386,550 B1* | 2/2013 | Mauer .................... | H03H 17/06 708/301 |
| 8,983,483 B2* | 3/2015 | Lee ................... | H04W 72/1215 455/452.1 |
| 2010/0023571 A1* | 1/2010 | Furukawa ............... | G06F 7/728 708/491 |
| 2019/0325309 A1* | 10/2019 | Flamant .............. | G06F 16/9024 |

FOREIGN PATENT DOCUMENTS

JP        2016-99707 A        5/2016

OTHER PUBLICATIONS

Saining Xie, et al.; "Holistically-Nested Edge Detection;" in Proceedings of ICCV 2015; pp. 1395-1403.

* cited by examiner

*Primary Examiner* — Tan V Mai
(74) *Attorney, Agent, or Firm* — Canon U.S.A., Inc. IP Division

(57) ABSTRACT

An apparatus includes a first holding unit and a second holding unit configured to hold first-type data and second-type data, respectively, a first operation unit configured to execute a first product-sum operation based on the first-type data, a branch unit configured to output an operation result of the first product-sum operation in parallel, a sampling unit configured to sample the operation result and to output a sampling result, and a second operation unit configured to execute a second product-sum operation based on the second-type data and the sampling result.

43 Claims, 12 Drawing Sheets

NETWORK IN WHICH FEATURE IMAGES IN ONE LAYER HAVE SAME SIZE

NETWORK IN WHICH FEATURE IMAGES IN ONE LAYER HAVE DIFFERENT SIZES

APPARATUS AND METHOD USING NEURAL NETWORK

BACKGROUND OF THE INVENTION

Field of the Invention

The aspect of the embodiments relates to data processing using a neural network.

Description of the Related Art

With the recent advancement of deep learning, an accuracy of image recognition has increased. A convolutional neural network (CNN) is known as a technique used for deep learning. In the CNN, a plurality of layers is connected in cascade. Each layer includes a plurality of feature images, and a filter processing result is calculated using learned filter coefficients and pixels of feature images. The filter processing is a product-sum operation including a plurality of multiplications and cumulative additions.

A feature image (O(.)) in a second layer is calculated using a feature image (I(.)) in a first layer and a filter coefficient corresponding to the first layer. To calculate one feature image in the second layer, information about a plurality of feature images in the first layer is required. The convolutional operation is represented by the following expression (1).

$$O_{i,j}(n) = \sum_{m=1}^{M} \sum_{x=1}^{X} \sum_{y=1}^{Y} (I_{i+x,j+y}(m) \times C_{x,y}(m, n)) \quad (1)$$

The first layer includes M feature images, and the m-th feature image is represented by I(m). In this case, X×Y filter coefficients (C1, 1(m, n) to CX, Y(m, n)) are used, and different filter coefficients are set for the respective feature images. The number of product-sum operations for calculating an output pixel Oi, j(n) in the second layer is represented by M×X×Y. After the convolutional operation is performed, processing, such as activation processing and pooling processing, is performed using the output pixel Oi, j(n).

In the CNN, a large number of product-sum operations are carried out. Accordingly, in a case where the CNN is applied to an embedded system, such as a mobile terminal or an on-vehicle device, a data processing apparatus with a high processing efficiency is used. Japanese Patent Application Laid-Open No. 2016-99707 discusses a configuration in which a common computing unit performs product-sum operations on each layer of the CNN.

In addition, a technique for changing a network configuration of the CNN to increase the accuracy of image recognition is proposed. As discussed by Saining Xie, Zhuowen Tu, "Holistically-Nested Edge Detection" in Proceedings of ICCV 2015, a side-output layer is generated using feature images in each layer. In many cases, the feature images in the side-output layer have different resolutions depending on the layer. Accordingly, in order to generate a last output result, sampling processing for matching the sizes of the feature images is used.

In a case where the technique discussed in Japanese Patent Application Laid-Open No. 2016-99707 is applied to the CNN of the related art, the use of the common computing unit makes it possible to suppress the cost of a data processing apparatus. However, in a case where the CNN is applied to the side-output network discussed by Saining Xie, Zhuowen Tu, "Holistically-Nested Edge Detection" in Proceedings of ICCV 2015, the feature images in the side-output layer obtained after sampling have different resolutions, which may result in deterioration of the processing efficiency of the computing unit.

The processing efficiency of the computing unit is calculated by the following expression (2).

$$E = \frac{\sum_{i=1}^{S} H_i \times W_i \times C_i}{\sum_{i=1}^{S} \left( h \left\lceil \frac{H_i}{h} \right\rceil \times w \left\lceil \frac{W_i}{w} \right\rceil \times c \left\lceil \frac{C_i}{c} \right\rceil \right)} \times 100\% \quad (2)$$

In the expression (2), S represents the number of types of feature images in each layer, $H_i$, $W_i$, and $C_i$ represent the height, the width, and the number of "i" type feature images, respectively, and $h_i$, $w_i$, and $c_i$ represent the height, the width, and the number of feature images that can be processed in parallel by the computing unit, respectively.

FIG. 12A illustrates an example of a network in which the feature images in one layer have the same resolution (S=1). A layer 1 includes 12 feature images 1201 each having a resolution of 30×30, and ($H_1$, $W_1$, $C_1$) respectively correspond to (30, 30, 12). In the case of using a computing unit capable of processing four feature images each having a resolution of 15×15 in parallel, (h, w, c) respectively correspond to (15, 15, 6). The height, the width, and the number of the feature images are multiples of the height, the width, and the number of feature images that can be processed in parallel by the computing unit, respectively. Accordingly, the feature images are processed in eight operations, and the processing efficiency is 100%.

FIG. 12B illustrates an example of a network in which the feature images in one layer have different resolutions (S=2). The layer 1 includes four first-type feature images 1201 each having a resolution of 30×30 and two second-type feature images 1203 each having a resolution of 60×60, and ($H_1$, $W_1$, $C_1$) respectively correspond to (30, 30, 4) and ($H_2$, $W_2$, $C_2$) respectively correspond to (60, 60, 2). In the case of using a computing unit capable of processing four feature images each having a resolution of 15×15 in parallel, (h, w, c) respectively correspond to (15, 15, 6). The height and the width of the first-type feature images are multiples of the height and the width of feature images that can be processed in parallel by the computing unit, respectively, but the number of the first-type feature images does not correspond to the number of feature images that can be processed in parallel by the computing unit. The first-type feature images are processed in four operations.

Like the first-type feature images, the height and the width of the second-type feature images are multiples of the height and the width of feature images that can be processed in parallel by the computing unit, but the number of the second-type feature images does not correspond to the number of feature images that can be processed in parallel by the computing unit. The second-type feature images are processed in 16 operations. The sum of the number of processes to be performed on the first-type feature images and the number of processes to be performed on the second-type feature images is 20, and the processing efficiency is 40%.

As described above, the total number of pixels of the feature images in the layer 1 in the example illustrated in FIG. 12A is the same as that in the example illustrated in FIG. 12B. However, the size of the feature images in the example illustrated in FIG. 12B is not a multiple of the size of the feature images that can be processed by the computing unit, which leads to a deterioration in processing efficiency and an increase in processing time.

SUMMARY OF THE INVENTION

According to an aspect of the embodiments, an apparatus includes a first holding unit and a second holding unit configured to hold first-type data and second-type data, respectively, a first operation unit configured to execute a first product-sum operation based on the first-type data, a branch unit configured to output an operation result of the first product-sum operation in parallel, a sampling unit configured to sample the operation result and to output a sampling result, and a second operation unit configured to execute a second product-sum operation based on the second-type data and the sampling result.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings.

<Configuration Example of Data Processing Apparatus>

Figure 2:
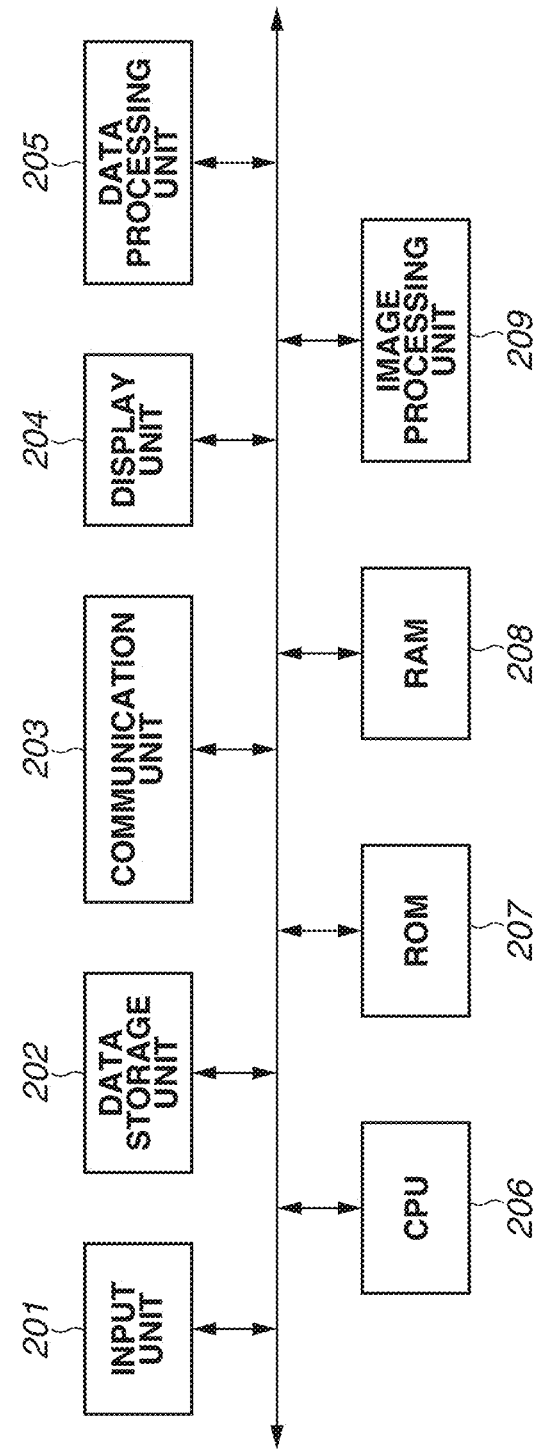
FIG. 2 is a block diagram illustrating a configuration example of a data processing apparatus according to the first exemplary embodiment.

FIG. 2 is a block diagram illustrating a configuration example of a data processing apparatus according to a first exemplary embodiment.

A data storage unit 202 is a unit that stores image data. The data storage unit 202 generally includes a hard disk, a flexible disk, a compact disc read-only memory (CD-ROM), a compact disc-recordable (CD-R), a digital versatile disc (DVD), a memory card, a CompactFlash (CF) card, Smart-Media, a secure digital (SD) card, a memory stick, an extreme digital (XD) picture card, and a universal serial bus (USB) memory. The data storage unit 202 can store not only image data, but also programs and data other than image data. Alternatively, a part of a random access memory (RAM) 208 to be described below can be used as the data storage unit 202. More alternatively, a virtual configuration in which a storage device of an apparatus connected by a communication unit 203 to be described below is used via the communication unit 203 can be used.

A display unit 204 is an apparatus that displays images obtained before and after image processing, or displays images such as a graphical user interface (GUI). In general, a cathode ray tube (CRT), a liquid crystal display, and the like are used. Alternatively, a display apparatus located outside of an apparatus connected via a cable or the like can be used.

An input unit 201 is an apparatus used to input data or instructions from a user. The input unit 201 includes a keyboard, a pointing device, and buttons.

The display unit 204 and the input unit 201 can be integrated into one apparatus, like a known touch screen apparatus. In this case, an input through a touch screen is treated as an input through the input unit 201.

A central processing unit (CPU) 206 controls an overall operation of the data processing apparatus. A read-only memory (ROM) 207 and the RAM 208 are used to provide the CPU 206 with a program, data, a work area, and the like for the processing. When a program for the processing to be described below is stored in the data storage unit 202 or the ROM 207, the program is temporarily loaded into the RAM 208 and is then executed. Alternatively, when the data processing apparatus receives a program via the communication unit 203, the program is temporarily recorded on the data storage unit 202 and is then loaded into the RAM 208, or is directly loaded into the RAM 208 from the communication unit 203 and is then executed.

An image processing unit 209 receives a command from the CPU 206, reads out image data written in the data storage unit 202, adjusts a range of pixel values, and writes the adjustment result into the RAM 208 again.

A data processing unit 205 performs filter processing (steps S101 to S113 in FIG. 1) using image processing results stored in the RAM 208 in accordance with a flowchart illustrated in FIG. 1 to be described below, and outputs the filter processing result to the data storage unit 202 (or the RAM 208). Based on the filter processing result, the CPU 206 performs image processing or image recognition on a moving image (a plurality of frames). The result of image processing or image recognition performed by the CPU 206 is stored in the RAM 208.

While FIG. 2 illustrates a configuration in which the number of CPUs is only one (CPU 206), a plurality of CPUs can be provided. The data processing unit 205 can be configured using a CPU.

The communication unit 203 is an interface (I/F) for communication between apparatuses. While FIG. 2 illustrates a configuration in which the input unit 201, the data storage unit 202, and the display unit 204 are included in one apparatus, these units can be connected via a communication path using a known communication method, to thereby implement the configuration as described above as a whole.

Although the system configuration of the data processing apparatus includes various components other than the above-described components, the other components are not the focus of the disclosure and thus the descriptions thereof are omitted.

Figure 3:
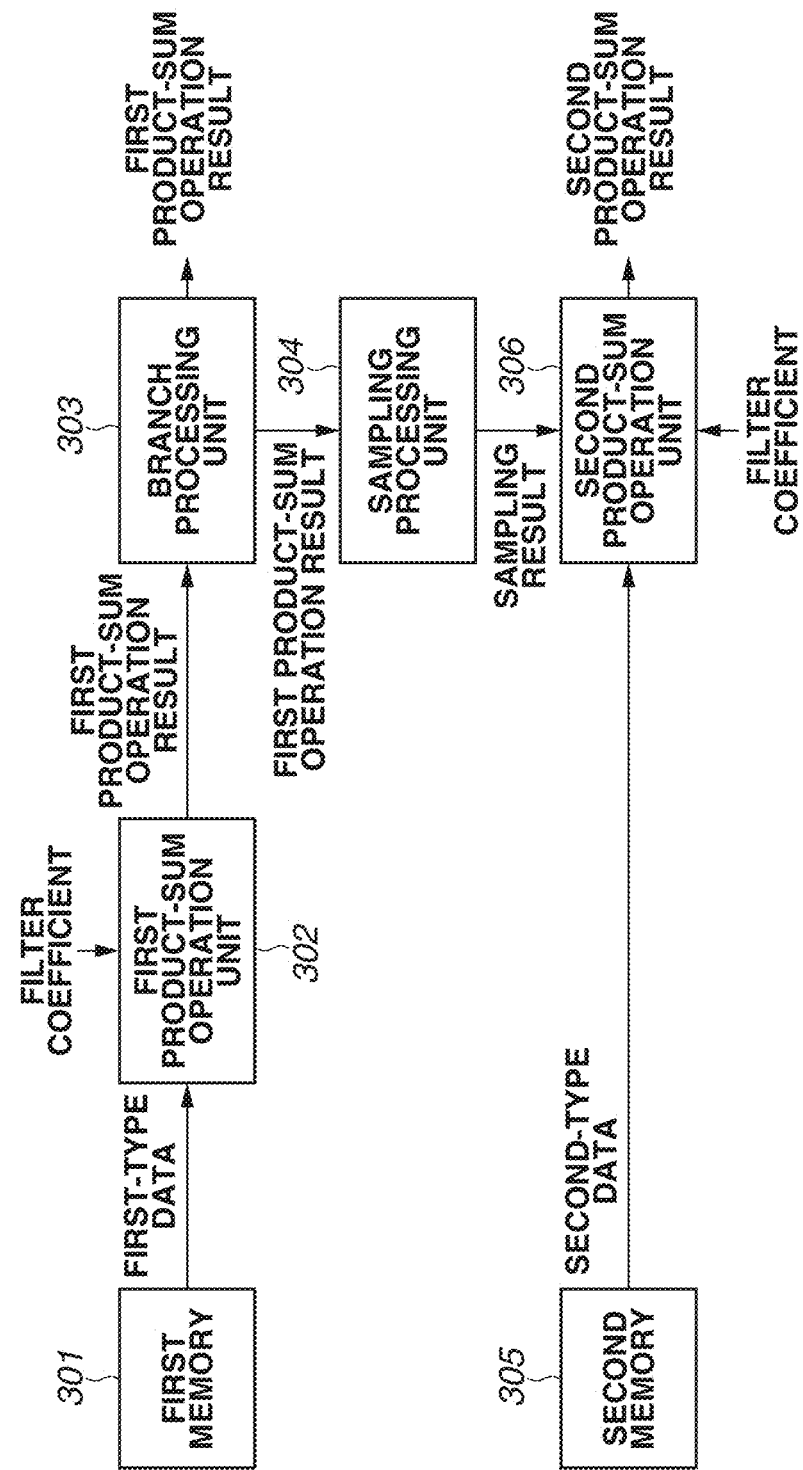
FIG. 3 is a block diagram illustrating a data processing unit according to the first exemplary embodiment.

FIG. 3 illustrates a configuration of the data processing unit 205. The data processing unit 205 includes a first memory 301, a first product-sum operation unit 302, a branch processing unit 303, a sampling processing unit 304, a second memory 305, and a second product-sum operation unit 306. The first memory 301 is a memory that holds first-type data, and the second memory 305 is a memory that holds second-type data. The first product-sum operation unit 302 calculates a first-ranked product-sum operation result based on the first-type data, and the second product-sum operation unit 306 calculates a second-ranked product-sum operation result based on the second-type data. The branch processing unit 303 copies the first product-sum operation result and outputs the first product-sum operation result by dividing the first product-sum operation result into two portions. The sampling processing unit 304 samples the first product-sum operation result and outputs a sampling result.

Figure 4:
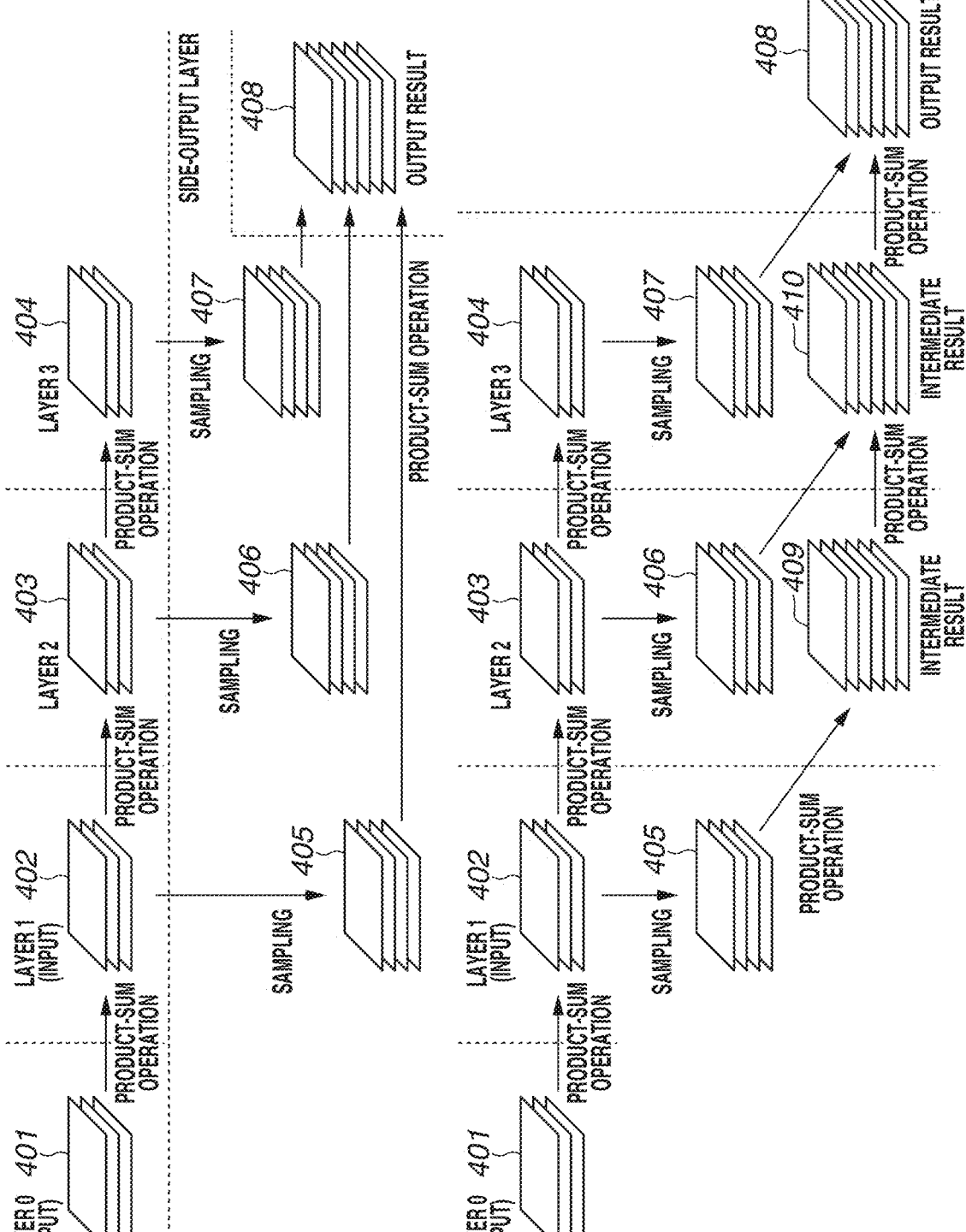
FIGS. 4A and 4B each illustrate a network configuration example according to the first exemplary embodiment.

FIGS. 4A and 4B each illustrate a network configuration example. In the network configuration example illustrated in FIG. 4A, outputs from layers 1 to 3 are sampled and sampling results are integrated to generate an output result. In the network configuration example illustrated in FIG. 4B, outputs from the layers 1 to 3 are sampled and sampling results in a plurality of layers are sequentially integrated to generate an output result.

<Flowchart of Filter Processing>

Figure 1:
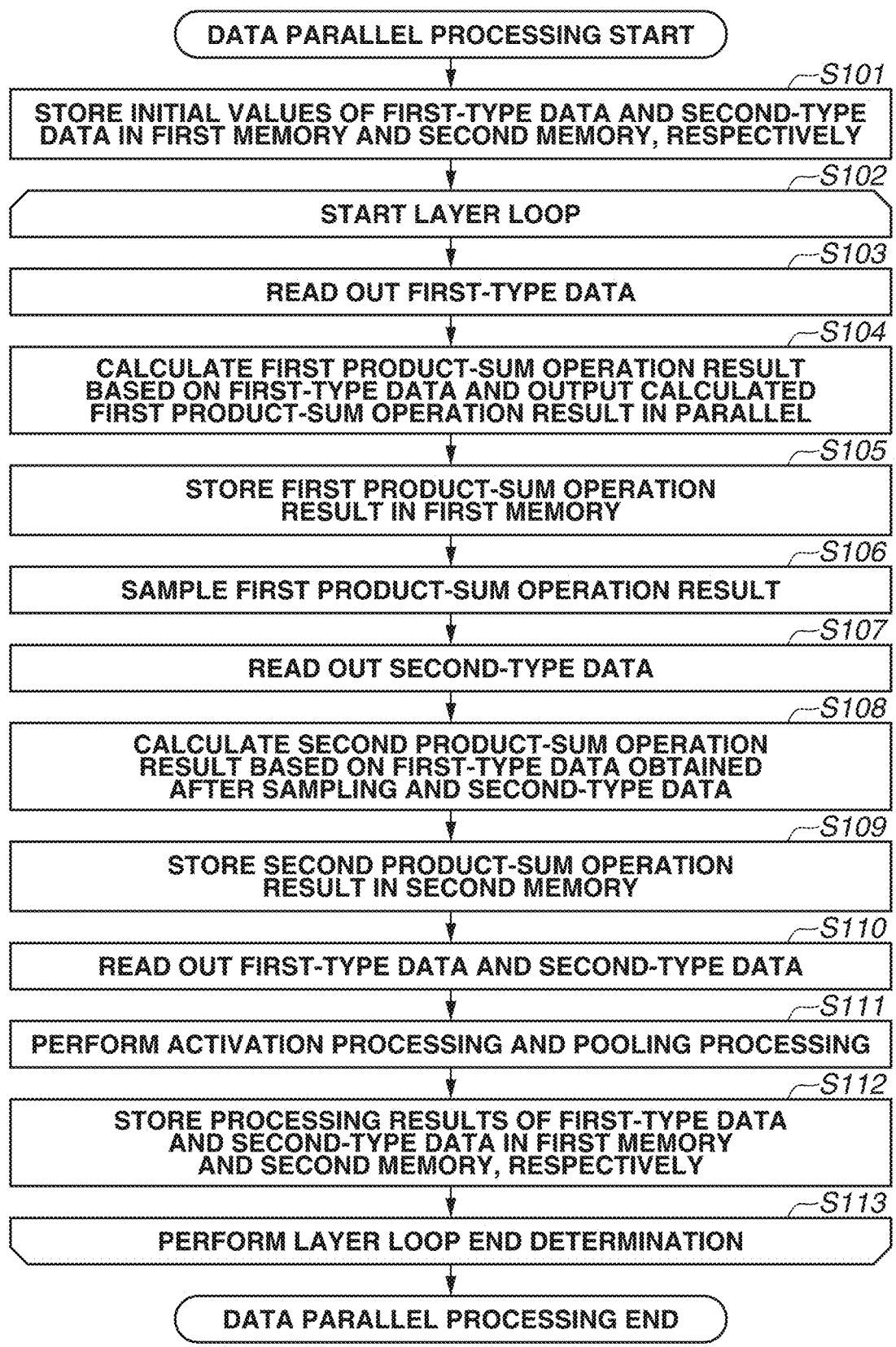
FIG. 1 is a flowchart illustrating data processing according to a first exemplary embodiment.
Figure 12A:
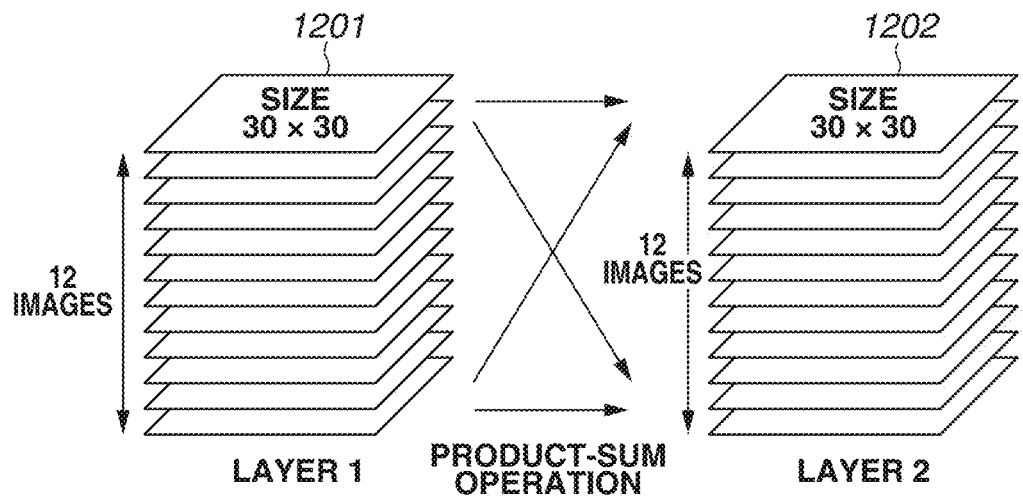
FIG. 12A illustrates an example of a network in which feature images in one layer have the same resolution.
Figure 12B:
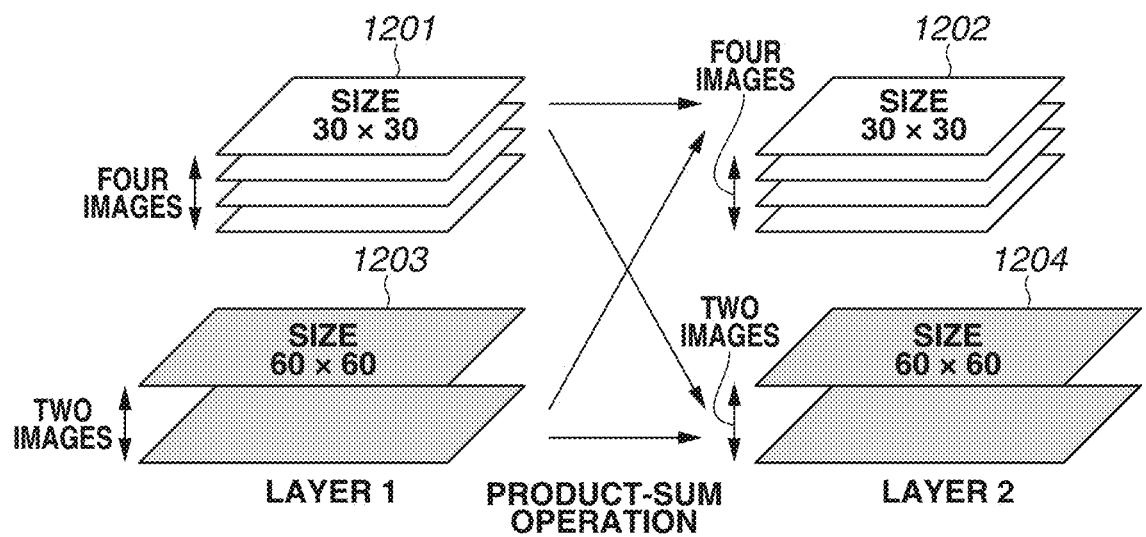
FIG. 12B illustrates an example of a network in which feature images in one layer have different resolutions.

FIG. 1 is a flowchart illustrating filter processing according to the present exemplary embodiment. Each step in the flowchart illustrated in FIG. 1 will be described based on the configuration of the data processing unit 205 illustrated in FIG. 3 and an example of a network in which feature images in one layer have different resolutions as illustrated in FIG. 12B.

In step S101, initial values of the first-type data and the second-type data (feature images) are stored in the first memory 301 and the second memory 305, respectively. Here, the first-type data has a resolution of 30×30, and the second-type data has a resolution of 60×60. The image data stored in the RAM 208 can be used as the initial value.

In step S102, a layer loop starts. In step S103, the first-type data is read out from the first memory 301, and the first-type data is input to the first product-sum operation unit 302.

In step S104, the first product-sum operation unit 302 calculates the first product-sum operation result based on the first-type data, and the branch processing unit 303 outputs the first product-sum operation result in parallel. One first product-sum operation result is branched into two portions.

In step S105, the first product-sum operation result is stored as the first-type data in the first memory 301.

In step S106, the first product-sum operation result is sampled and converted into a resolution. Since the first-type data has a resolution of 30×30 and the second-type data has a resolution of 60×60, the magnification of sampling is 2×2 and the resolution of the first-type data obtained after sampling is 60×60.

In step S107, the second-type data is read out from the first memory 301 and the second-type data is input to the second product-sum operation unit 306.

In step S108, a second product-sum operation result is calculated based on the first-type data obtained after sampling and the second-type data.

In step S109, the second product-sum operation result is stored as the second-type data in the second memory 305.

In step S110, the first-type data and the second-type data are read out from the first memory 301 and the second memory 305, respectively.

In step S111, the CPU 206 performs activation processing and pooling processing.

In step S112, the processing results of the first-type data and the second-type data are stored in the first memory 301 and the second memory 305, respectively.

In step S113, layer loop end determination is performed.

In the present exemplary embodiment, two types of product-sum operation results are calculated using two product-sum operation units (the first product-sum operation unit 302 and the second product-sum operation unit 306). Accordingly, the processing efficiency of the entire computing unit is calculated by the expression (2) described above. In this case, S is 2.

FIG. 12B illustrates an example of a network in which feature images in one layer have different resolutions (S=2). The layer 1 includes four first-type feature images 1201 each having a resolution or 30×30 and two second-type feature images 1203 each having a resolution of 60×60, and ($H_1$, $W_1$, $C_1$) respectively correspond to (30, 30, 4) and ($H_2$, $W_2$, $C_2$) respectively correspond to (60, 60, 2).

The first product-sum operation unit 302 includes a computing unit capable of processing two feature images each having a resolution of 15×15 in parallel, and ($h_1$, $w_1$, $c_1$) respectively correspond to (15, 15, 2). The height, the width, and the number of the feature images are multiples of the height, the width, and the number of features images that can be processed in parallel by the computing unit, respectively, and the feature images are processed in eight operations. The first product-sum operation unit 302 includes a computing unit capable of processing one feature image having a resolution of 30×30 in parallel, and ($h_2$, $w_2$, $c_2$) respectively correspond to (30, 30, 1). The height, the width, and the number of the feature images are multiples of the height, the width, and the number of feature images that can be processed in parallel by the computing unit, respectively, and the feature images are processed in eight operations. The first product-sum operation unit 302 can process 450 pieces of feature data in parallel, and the processing efficiency of the computing unit is 100%. Like the first product-sum operation unit 302, the second product-sum operation unit 306 can process 900 pieces of feature data in parallel, and the processing efficiency of the computing unit is 100%.

In the conventional technique, the product-sum operations are executed by the same computing unit (one product-sum operation unit). When the computing units include a computing unit capable of processing six feature images each having a resolution of 15×15 in parallel, the computing unit can process 1350 pieces of feature data in parallel as in the present exemplary embodiment, but the processing efficiency of the computing unit is 40%. Thus, in the present exemplary embodiment, the product-sum operations are executed using a plurality of computing units, which is beneficial in that the processing efficiency of each computing unit is high when various types of data are processed. The parallelism of each of the product-sum operations to be performed by the first product-sum operation unit 302 and the second product-sum operation unit 306 is determined based on the operation amount of each product-sum operation.

<Number of Bits>

The number of bits of each computing unit is determined in such a manner that the number of bits of data on the first-type feature images 1201 in the layer 1 matches the number of bits of data on the second-type feature images 1203 in the layer 1, thereby making it possible to suppress the cost of each computing unit.

An example in which the number of bits of data on the first-type feature images 1201 in the layer 1 is 16 bits and the number of bits of data on the second-type feature images 1203 in the layer 1 is 8 bits will be described.

In the conventional technique, the feature images 1201 in which the number of bits of data is 16 bits and the feature images 1203 in which the number of bits of data is 8 bits are processed using a 16-bit computing unit. When the feature images 1201 is to be processed in parallel, the number of bits of the entire data is 16 bits, and thus a computing unit that processes 1350 pieces of 16-bit feature data in parallel is used.

In the present exemplary embodiment, the 16-bit computing unit (the first product-sum operation unit 302) is used to process the feature images 1201 in which the number of bits of data is 16 bits, and the 8-bit computing unit (the second product-sum operation unit 306) is used to process the feature images 1203 in which the number of bits of data is 8 bits. When the feature images 1201 is to be processed in parallel, a computing unit that processes 450 pieces of 16-bit feature data in parallel is used. When the feature images 1203 is to be processed in parallel, a computing unit that processes 900 pieces of 16-bit feature data in parallel is used. The total number (1350) of computing units in the present exemplary embodiment is the same as that in the related art technique. However, in the present exemplary embodiment, the number of bits of a part of computing units is 8 bits, and the cost of 8-bit computing units is lower than the cost of 16-bit computing units.

Although the first exemplary embodiment illustrates a method for improving the processing efficiency, if the processing time for the first product-sum operation is different from the processing time for the second product-sum operation, the end time of the first product-sum operation may be later than the end time of the second product-sum operation, and thus a delay occurs.

Figure 5:
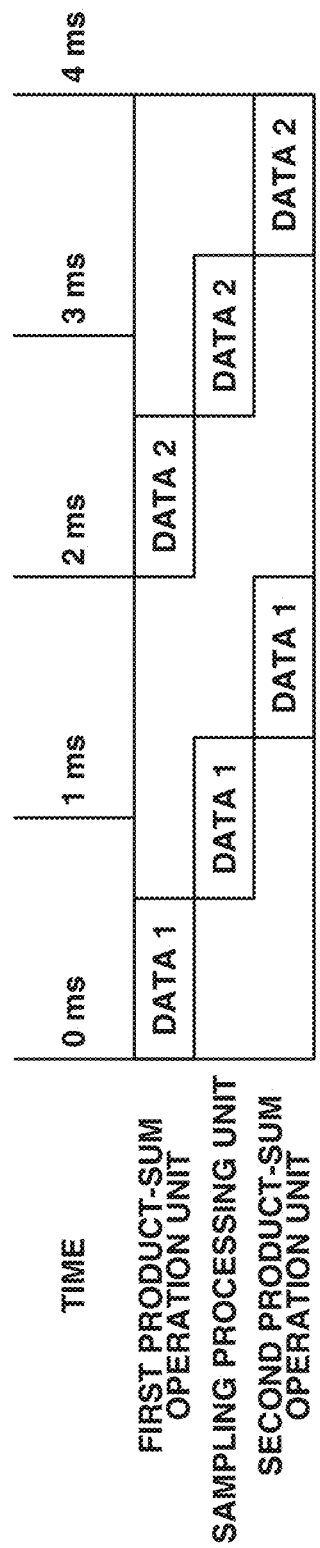
FIG. 5 is a diagram illustrating a relationship between a processing time and data according to the first exemplary embodiment.

FIG. 5 illustrates an example of a processing time for the first product-sum operation processing and a processing time for the second product-sum operation processing. The first product-sum operation unit 302 calculates the product-sum operation result of data 1, and the sampling processing unit 304 performs sampling. After that, the second product-sum operation unit 306 calculates the product-sum operation result based on the sampling result of the data 1. It takes 4 ms to sequentially operate the first product-sum operation unit 302, the sampling processing unit 304, and the second product-sum operation unit 306 to perform the second product-sum operation on the data 1 and the data 2.

Figure 6:
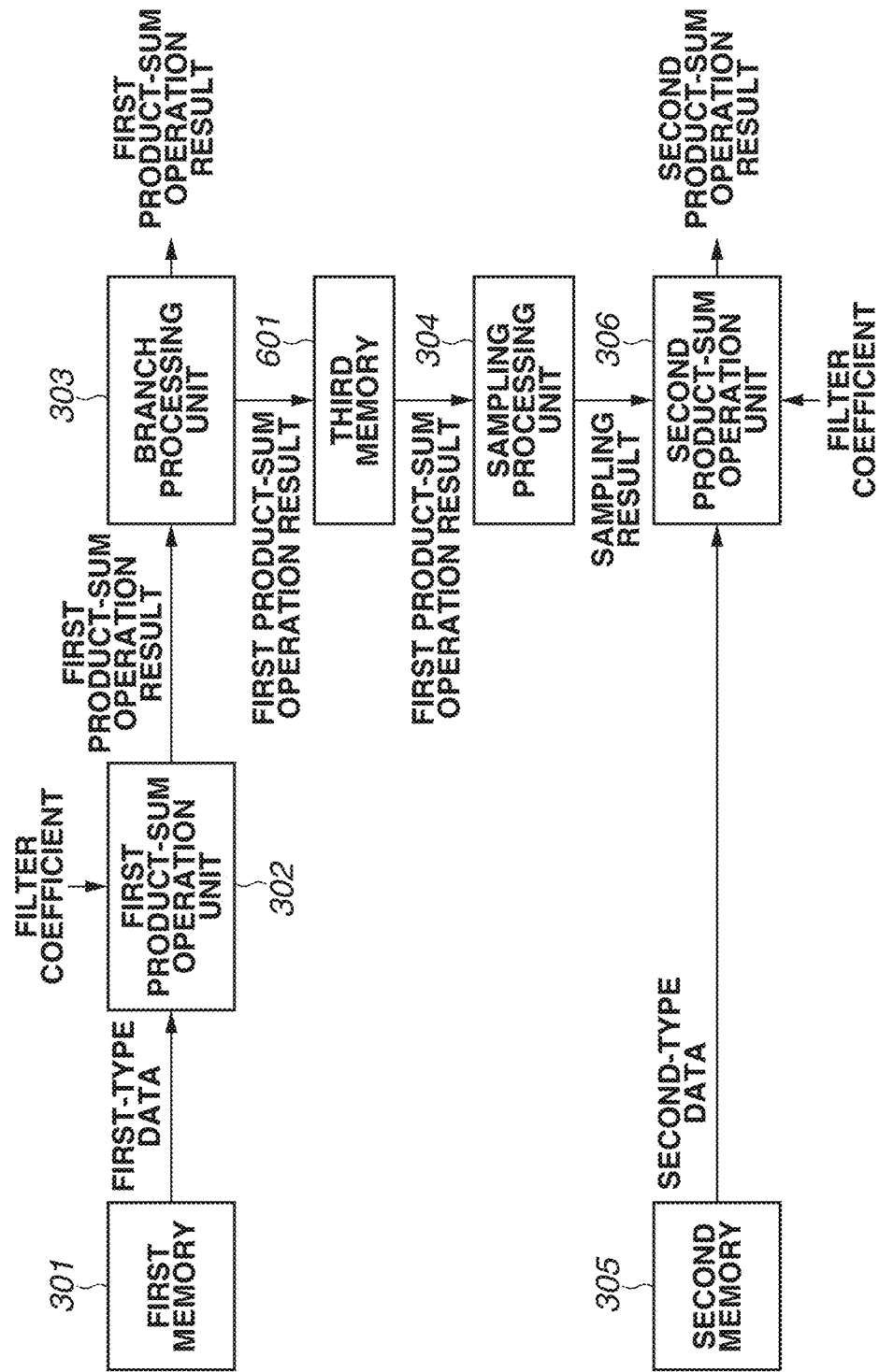
FIG. 6 is a block diagram illustrating a data processing unit according to a second exemplary embodiment.
Figure 7:
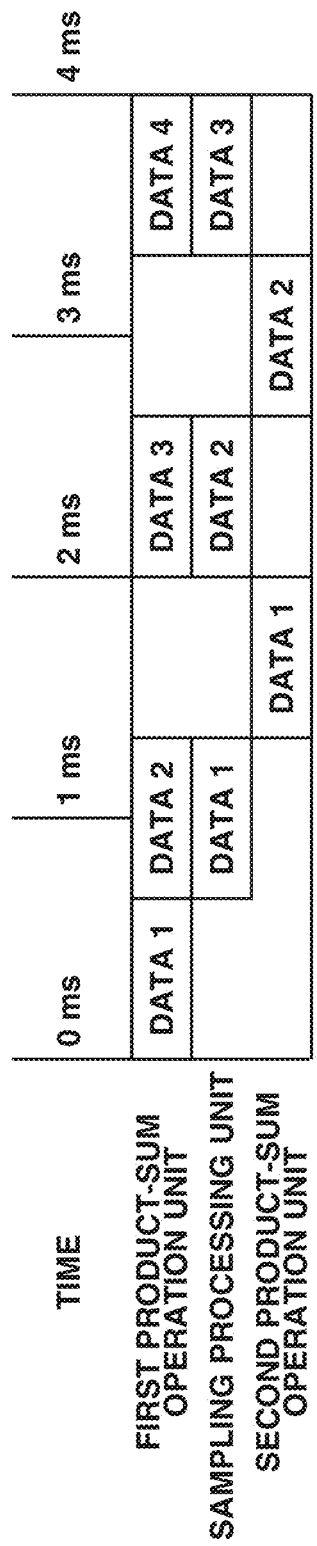
FIG. 7 is a diagram illustrating a relationship between a processing time and data according to the second exemplary embodiment.

A second exemplary embodiment illustrates a method for absorbing a delay in the second memory 305 so as to increase the processing efficiency. FIGS. 6 and 7 each illustrate an example of storing intermediate data in a third memory 601.

<FIFO1>

FIG. 6 is a block diagram illustrating an example in which the first product-sum operation result is stored in the third memory 601. Processing that is different from the processing performed in the first exemplary embodiment will be described.

The first product-sum operation result output from the first product-sum operation unit 302 is temporarily stored in the third memory 601. The sampling processing unit 304 samples the first product-sum operation result stored in the third memory 601, and calculates the sampling result.

FIG. 7 illustrates an example of a processing time for the first product-sum operation processing and a processing time for the second product-sum operation processing. Since the first product-sum operation result of the data 1 is stored in the third memory 601, the first product-sum operation result of the data 2 and the sampling processing result of the data 1 can be processed by pipeline, which leads to a reduction in processing time. The total of the processing time for the second product-sum operation on the data 1 and the processing time for the second product-sum operation on the data 2 is less than or equal to 4 ms.

<FIFO2>

Figure 8:
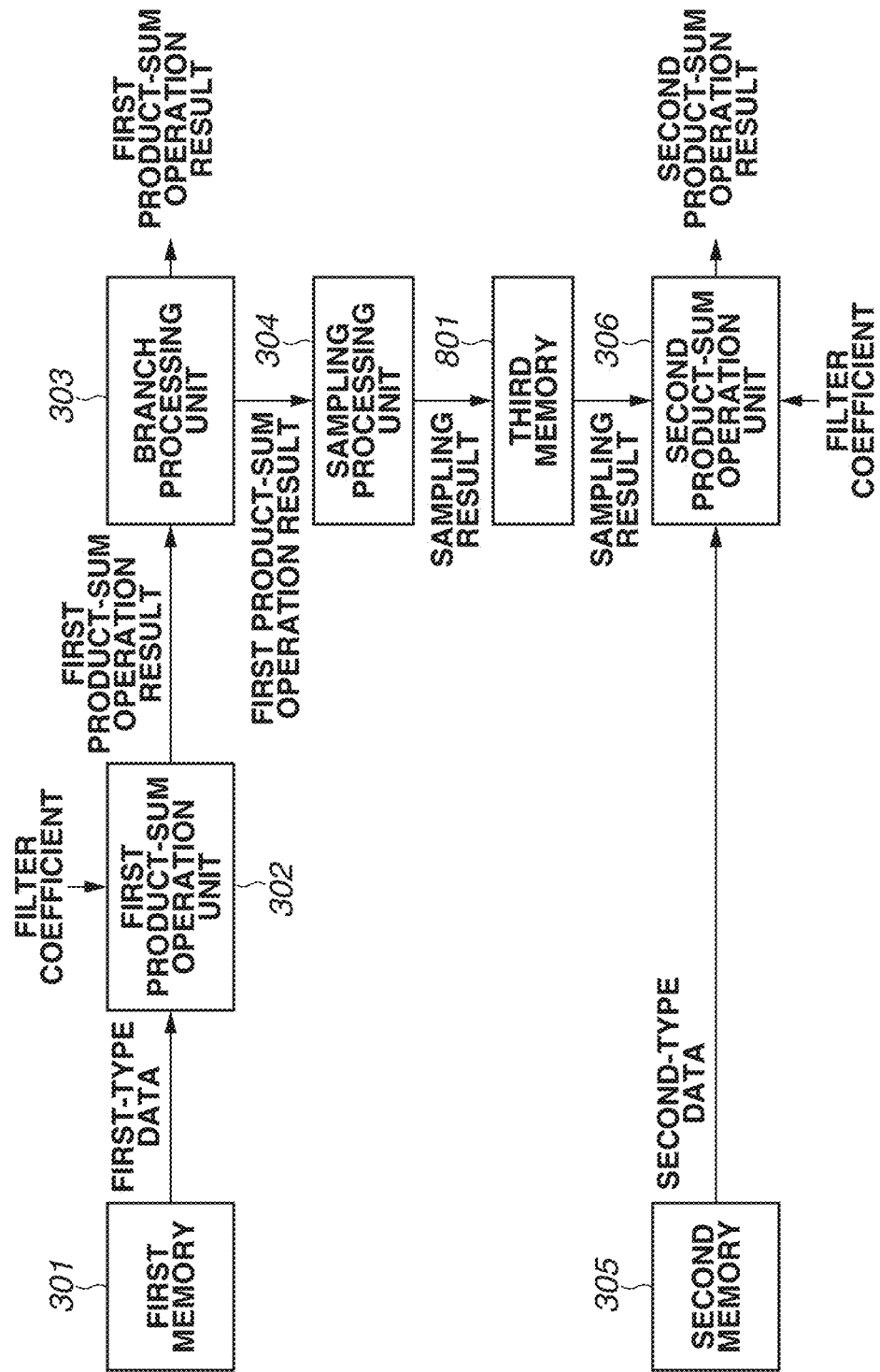
FIG. 8 is a block diagram illustrating the data processing unit according to the second exemplary embodiment.

FIG. 8 illustrates an example in which the sampling result is stored in a third memory 801. Processing that is different from the processing performed in the first exemplary embodiment will be described.

The sampling result output from the sampling processing unit 304 is stored in the third memory 801. The second product-sum operation unit 306 calculates the second product-sum operation result based on the second-type data stored in the second memory 305 and the sampling result stored in the third memory 801.

Figure 9:
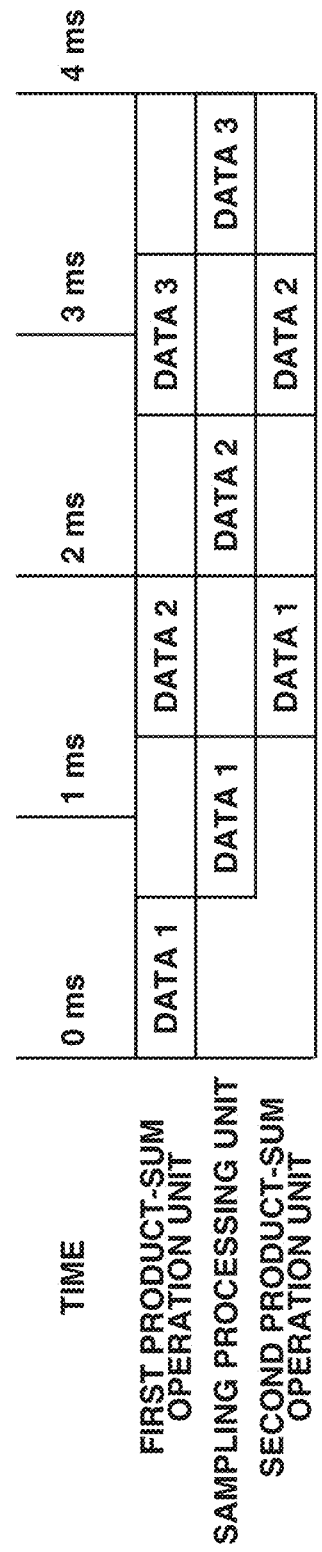
FIG. 9 is a diagram illustrating a relationship between a processing time and data according to the second exemplary embodiment.

FIG. 9 illustrates an example of a processing time for the first product-sum operation processing and a processing time for the second product-sum operation processing. Since the sampling result of the data 1 is stored in the third memory 801, the first product-sum operation result of the data 2 and the first product-sum operation result of the data 1 can be processed by pipeline, which leads to a reduction in processing time. The total of the processing time for the second product-sum operation on the data 1 and the processing time for the second product-sum operation on the data 2 is less than or equal to 4 ms.

A third exemplary embodiment illustrates an example in which the activation processing that is indispensable for a neural network is taken into consideration. In the case of calculating the product-sum operation result of the second-type data, the accuracy of the processing result may vary depending on whether to refer to the first product-sum operation result obtained after the activation processing. Accordingly, the configuration of the data processing apparatus can be determined as needed.

<After Activation Processing>

Figure 10:
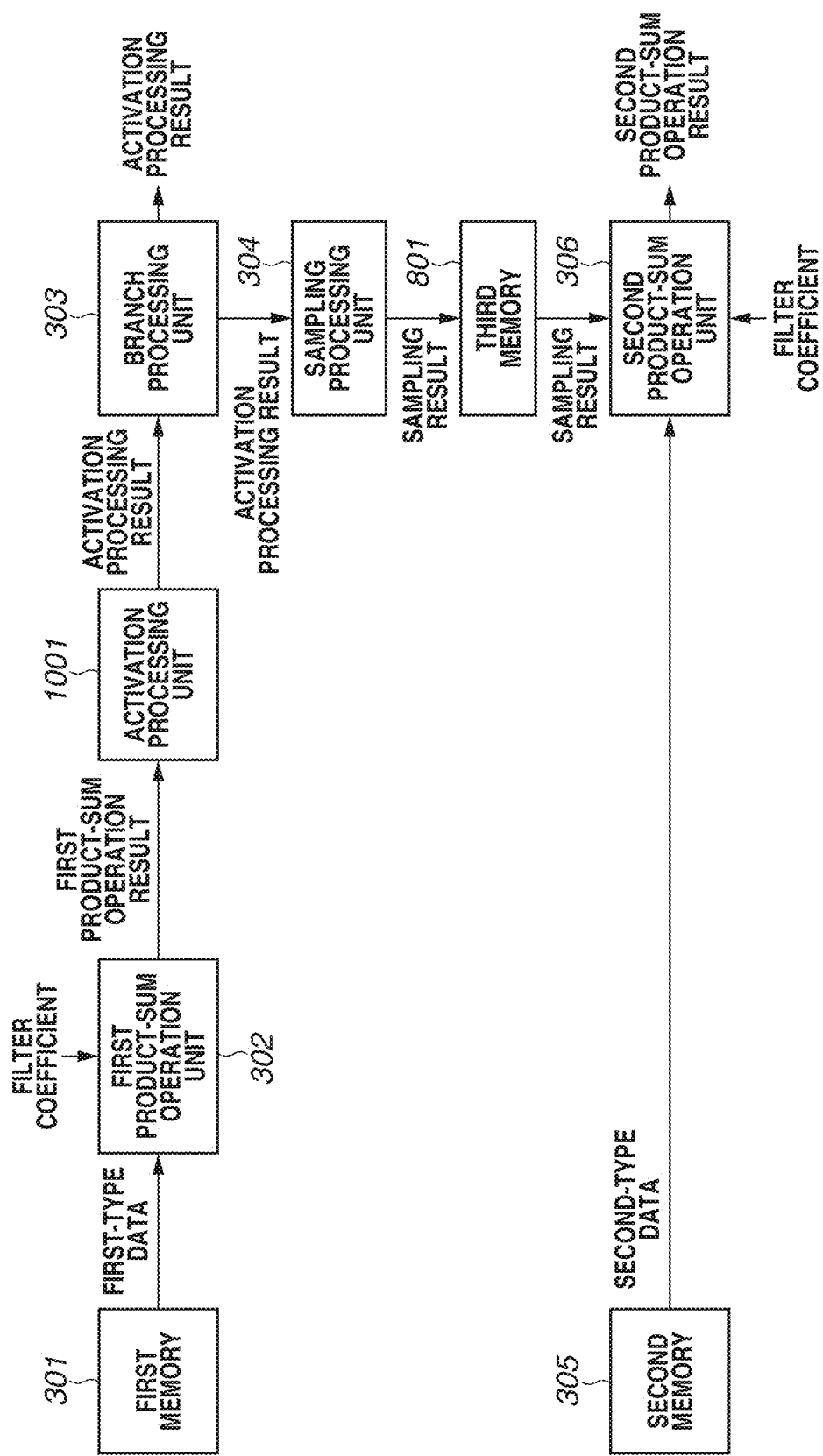
FIG. 10 is a block diagram illustrating a data processing unit according to a third exemplary embodiment.

FIG. 10 illustrates an example in which the first product-sum operation result obtained after the activation processing is referenced. Processing that is different from the processing performed in the second exemplary embodiment will be described. An activation processing unit 1001 calculates an activation processing result by the following expression (3) based on the first product-sum operation result output from the first product-sum operation unit 302.

$$f(x) = \begin{cases} 0, & x < 0 \\ x, & x \geq 0 \end{cases} \quad (3)$$

In the expression (3), f(•) represents an activation function, and x represents input data. In this example, the activation function is implemented by a Rectified Linear Unit (ReLU). However, the activation function can be implemented not only by the ReLU, but also by other nonlinear functions.

The branch processing unit 303 outputs the activation processing result in parallel. One activation processing result is referenced in processing to be performed on a subsequent layer. The sampling processing unit 304 refers to the other activation processing result and stores the activation processing result in the third memory 801. The second product-sum operation result is calculated based on the sampling result of the first product-sum operation result obtained after the activation processing and the second-type data.

<Before Activation Processing>

Figure 11:
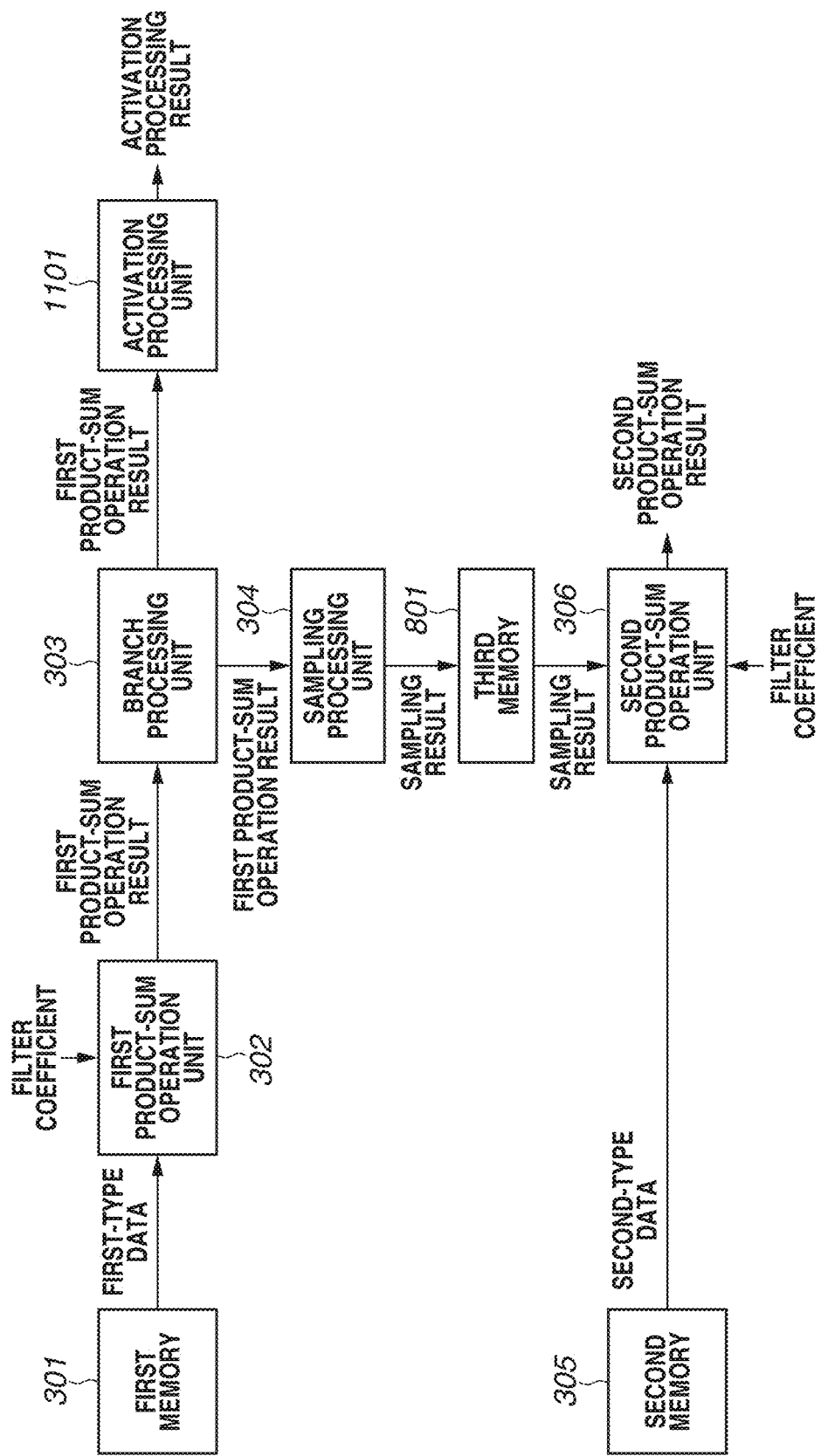
FIG. 11 is a block diagram illustrating the data processing unit according to the third exemplary embodiment.

FIG. 11 illustrates an example in which the first product-sum operation result obtained before the activation processing is referenced. Processing that is different from the processing performed in the second exemplary embodiment will be described. An activation processing unit 1101 calculates the activation processing result by the expression (2) based on the first product-sum operation result output from the branch processing unit 303.

The activation processing result is referenced in the processing to be performed on the subsequent layer, but is not used for the sampling processing nor for the second product-sum operation unit 306. The second product-sum operation result is calculated based on the sampling result of the first product-sum operation result obtained before the activation processing and the second-type data.

In the first to third exemplary embodiments, a filter size is not particularly described. However, the filter size is not particularly limited, and any filter size can be used. If the filter size is small, there is a benefit that the size of the third memory 801 described in the second and third exemplary embodiments can be reduced.

In step S104 according to the first exemplary embodiment, the first product-sum operation result is calculated based on the first-type data. However, the data used for calculating the first product-sum operation result is not limited to the first-type data. The first product-sum operation result can be calculated based on both the first-type data and the second-type data.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-085519, filed Apr. 26, 2018, which is hereby incorporated by reference herein in its entirety.

What is claimed is:

1. An apparatus comprising:
a first holding unit and a second holding unit configured to hold first-type data and second-type data, respectively; and
a plurality of circuitries, wherein the plurality of circuitries function as:
a first operation unit configured to execute a first product-sum operation based on the first-type data;
a branch unit configured to output an operation result of the first product- sum operation in parallel;
a sampling unit configured to sample the operation result to output a sampling result; and
a second operation unit configured to execute a second product-sum operation based on the second-type data and the sampling result.

2. The apparatus according to claim 1, wherein the first operation unit and the second operation unit execute the first product-sum operation and the second product-sum operation in parallel.

3. The apparatus according to claim 1, wherein operation amounts of operations to be executed by the first and second product-sum operation units are predetermined in accordance with the first-type data and second-type data.

4. The apparatus according to claim 1, wherein the first holding unit stores the operation result of the first product-sum operation as the first-type data.

5. The apparatus according to claim 4, wherein the branch unit outputs the same operation result of the first product-sum operation to the sampling unit and the first holding unit in parallel.

6. The apparatus according to claim 1, wherein the second holding unit stores an operation result of the second product-sum operation as the second- type data.

7. The apparatus according to claim 1, wherein a number of bits of the first-type data is different from a number of bits of the second-type data.

8. The apparatus according to claim 7, wherein a number of bits of the first operation unit is determined depending on the number of bits of the first-type data, and a number of bits of the second operation unit is determined depending on the number of bits of the second-type data.

9. The apparatus according to claim 7, wherein a number of bits of the first holding unit is determined depending on the number of bits of the first-type data, and a number of bits of the second holding unit is determined depending on the number of bits of the second-type data.

10. The apparatus according to claim 1, wherein the first operation unit executes a plurality of hierarchies of processing by repeatedly performing a product-sum operation.

11. The apparatus according to claim 1, wherein the second operation unit integrates a plurality of sampling results obtained by repeatedly performing a product-sum operation to generate an output result.

12. The apparatus according to claim 1, further comprising a third holding unit,
wherein the third holding unit temporarily holds the operation result, and
wherein the sampling unit samples the operation result held by the third holding unit, and outputs the sampling result.

13. The apparatus according to claim 1, further comprising a third holding unit,
wherein the third holding unit temporarily holds the sampling result, and
wherein the second operation unit executes the second product-sum operation based on the second-type data and the sampling result held by the third holding unit.

14. The apparatus according to claim 1, wherein the plurality of circuitries further function as an activation processing unit configured to calculate a result of activation processing based on the operation result, wherein the branch unit outputs the result of the activation processing in parallel.

15. The apparatus according to claim 1, wherein the plurality of circuitries further function as an activation processing unit configured to calculate a result of activation processing based on the operation result output from the branch unit.

16. The apparatus according to claim 1, wherein the first-type data and the second-type data are image data having different resolutions.

17. The apparatus according to claim 16, wherein the sampling unit performs sampling such that the resolution of the operation result of the first product-sum operation obtained after sampling matches the resolution of the second-type data.

18. The apparatus according to claim 1, wherein the first-type data and the second-type data are a plurality of pieces of image data.

19. The apparatus according to claim 1, wherein the second operation unit performs filter processing.

20. A method performed by an apparatus comprising:
holding first-type data and second-type data in a first holding unit and a second holding unit, respectively;
executing a first product-sum operation based on the first-type data;
branching an operation result of the first product-sum operation in parallel;
sampling the operation result and outputting a sampling result; and
executing a second product-sum operation based on the second-type data and the sampling result.

21. An apparatus comprising:
a first memory and a second memory configured to store first data in a first resolution and second data in a second resolution, respectively, where the second resolution is different from the first resolution; and
a plurality of circuitries, wherein the plurality of circuitries function as:
a first operation unit configured to perform a first product-sum operation based on the first data;
a conversion unit configured to convert a resolution of an operation result of the first product-sum operation to the second resolution; and
a second operation unit configured to perform a second product-sum operation based on the second data and the operation result of the first product- sum operation in the second resolution.

22. The apparatus according to claim 21, wherein the first memory stores the operation result of the first product-sum operation.

23. The apparatus according to claim 21, wherein the second memory stores an operation result of the second product-sum operation.

24. The apparatus according to claim 21, further comprising a third memory,
wherein the third memory temporarily stores the operation result of the first product-sum operation output from the first product-sum operation unit, and
wherein the conversion unit converts the resolution of the operation result of the first product-sum operation stored in the third memory, and outputs the converted result.

25. The apparatus according to claim 21, further comprising a third memory,
wherein the third memory temporarily stores the converted result output from the conversion unit, and
wherein the second operation unit performs the second product-sum operation based on the second data and the converted result stored in the third memory.

26. The apparatus according to claim 21, wherein the plurality of circuitries further function as a branch unit configured to output the operation result of the first product-sum operation to the conversion unit and the first memory in parallel.

27. The apparatus according to claim 26, wherein the plurality of circuitries further function as an activation processing unit configured to calculate a result of activation processing based on the operation result of the first product-sum operation, wherein the branch unit outputs the result of the activation processing in parallel.

28. The apparatus according to claim 26, wherein the plurality of circuitries further function as an activation processing unit configured to calculate a result of activation processing based on the operation result of the first product-sum operation output from the branch unit.

29. The apparatus according to claim 21, wherein different circuitries of the plurality of circuitries function as the first operation unit and the second operation unit, respectively.

30. A data processing apparatus using a neural network having a plurality of layers, at least one layer of the plurality of layers comprising:
a first memory and a second memory configured to store first data in a first resolution and second data in a second resolution, respectively, where the second resolution is different from the first resolution; and
a plurality of circuitries, wherein the plurality of circuitries function as:
a first operation unit configured to perform a first product-sum operation based on the first data;
a conversion unit configured to convert a resolution of an operation result of the first product-sum operation to the second resolution; and
a second operation unit configured to perform a second product-sum operation based on the second data and the operation result of the first product- sum operation in the second resolution.

31. The apparatus according to claim 30, wherein the result of the first product-sum operation and the result of the second product-sum operation of a first layer in the plurality of layers are used to provide the first data and the second data, respectively, for a second layer succeeding to the first layer in the plurality of layers.

32. The apparatus according to claim 31,
wherein the plurality of circuitries further function as a post-processing unit configured to perform a post-processing on the result of the first product-sum operation and a result of the second product-sum operation,
wherein the first memory stores a result of the post-processing performed on the result of the first product-sum operation of the first layer as the first data for the second layer, and
wherein the second memory stores a result of the post-processing performed on the result of the first product-sum operation of the first layer as the second data for the second layer.

33. The apparatus according to claim 32, wherein the post-processing includes an activation processing.

34. The apparatus according to claim 32, wherein the post-processing includes a pooling processing.

35. The apparatus according to claim 30, wherein the first product-sum operation unit and the second operation unit repeatedly perform the first product-sum operation and the second product-sum operation, respectively, for successive layers of the plurality of layers.

36. The apparatus according to claim 30, further comprising a third memory,
wherein the third memory temporarily stores the operation result of the first product-sum operation output from the first product-sum operation unit, and
wherein the conversion unit converts the resolution of the operation result of the first product-sum operation stored in the third memory, and outputs the converted result.

37. The apparatus according to claim 30, further comprising a third memory,
wherein the third memory temporarily stores the converted result output from the conversion unit, and
wherein the second operation unit performs the second product-sum operation based on the second data and the converted result stored in the third memory.

38. The apparatus according to claim 30, wherein the plurality of circuitries further function as a branch unit configured to output the operation result of the first product-sum operation to the conversion unit and the first memory in parallel.

39. The apparatus according to claim 38, wherein the plurality of circuitries further function as an activation processing unit configured to calculate a result of activation processing based on the operation result of the first product-sum operation, wherein the branch unit outputs the result of the activation processing in parallel.

40. The apparatus according to claim 38, wherein the plurality of circuitries further function as an activation processing unit configured to calculate a result of activation processing based on the operation result of the first product-sum operation output from the branch unit.

41. The apparatus according to claim 30, wherein different circuitries of the plurality of circuitries function as the first operation unit and the second operation unit, respectively.

42. A method performed by an apparatus comprising:
storing first data in a first resolution in a first memory and second data in a second resolution in a second memory, respectively, where the second resolution is different from the first resolution;
performing a first product-sum operation based on the first data;
converting a resolution of an operation result of the first product-sum operation to the second resolution; and
performing a second product-sum operation based on the second data and the operation result of the first product-sum operation in the second resolution.

43. A data processing method performed by using a neural network having a plurality of layers, the method, with respect to at least one layer of the plurality of layers, comprising:
storing first data in a first resolution in a first memory and second data in a second resolution in a second memory, respectively, where the second resolution is different from the first resolution;
performing a first product-sum operation based on the first data;
converting a resolution of an operation result of the first product-sum operation to the second resolution; and
performing a second product-sum operation based on the second data and the operation result of the first product-sum operation in the second resolution.

* * * * *